April 11, 1939.  R. J. MARVIN  2,154,342
OIL RING
Filed April 7, 1938
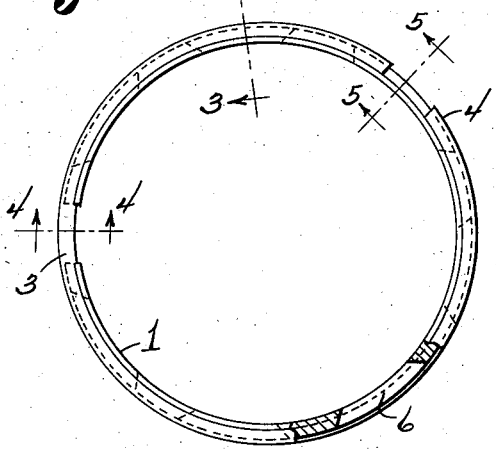
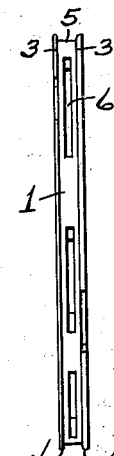
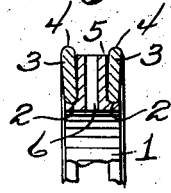
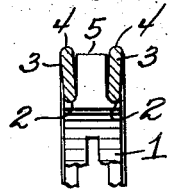
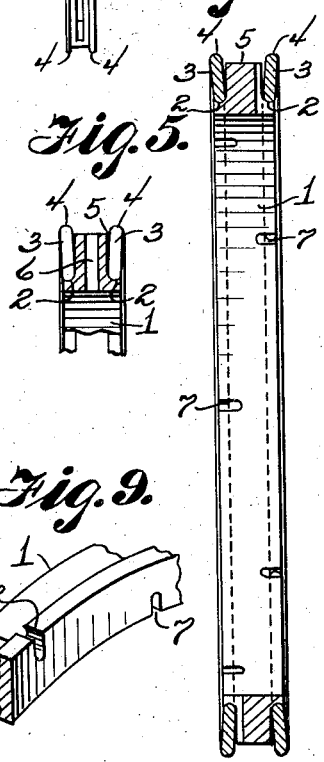
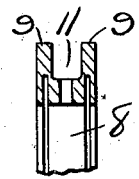
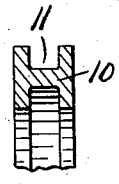
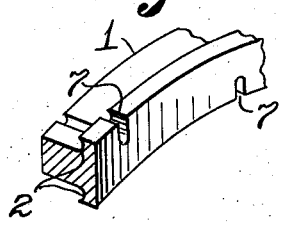
Ralph J. Marvin
INVENTOR
BY Victor J. Evans & Co.
ATTORNEYS Patented Apr. 11, 1939

2,154,342

UNITED STATES PATENT OFFICE 2,154,342

OIL RING

Ralph J. Marvin, Los Angeles, Calif., assignor of one-half to August Wiebke, Los Angeles, Calif.

Application April 7, 1938, Serial No. 200,796

3 Claims. (Cl. 309—45)

This invention relates to piston rings and has for the primary object the provision of an efficient, durable and inexpensive device of this character which will prevent the loss of compression in a cylinder by the compression leaking past the piston and also will prevent the passing of lubricant by the piston due to the channeled periphery of the ring which presents spaced double annular bearing surfaces for contact with the walls of the cylinder and a lubricant drain groove between said bearing surfaces.

With these and other objects in view, this invention consists in certain novel features of construction, combination and arrangement of parts to be hereinafter more fully described and claimed.

Figure 1 is a side elevation, partly in section, illustrating the piston ring constructed in accordance with my invention.

Figure 2 is an edge view illustrating the ring.

Figure 3 is a transverse sectional view taken on the line 3—3 of Figure 1.

Figure 4 is a transverse sectional view taken on line 4—4 of Figure 1.

Figure 5 is a transverse sectional view taken on line 5—5 of Figure 1.

Figure 6 is a transverse sectional view illustrating a modified form of my invention.

Figure 7 is a transverse sectional view illustrating another modified form of my invention.

Figure 8 is a transverse sectional view illustrating another modified form of my invention.

Figure 9 is a fragmentary perspective view illustrating a portion of the body of the type of ring shown in Figure 8 equipped with drain grooves.

Referring in detail to the drawing, the numeral 1 indicates a split annular body having opposite sides cut away inwardly from the periphery to form annular shoulders 2 on which are mounted split annular rings 3 which project beyond the periphery of the body 1 to present spaced bearing surfaces 4 to contact walls of the cylinder. The split rings being mounted on the shoulders of the body cooperate with the periphery of the body in forming a channel 5 between the spaced annular bearing surfaces. The channel 5 acts to accumulate lubricant therein and to permit the lubricant to drain out of the channel the bottom may be provided with slots 6 or grooves 7 in opposite sides thereof, as shown in Figure 9. The grooves 7 are arranged in staggered relation, as clearly shown in Figures 8 and 9. The rings 9 may be transversely cupped to take up side wear on the ring in entirety. The body 1 may be constructed of one type of metal while the rings 3 of another type of metal and preferably of spring tempered steel.

Referring to my modified form of invention, the body of the ring is indicated by the character 8 and is of substantially U-shape in cross section presenting spaced bearing surfaces 9 to contact the walls of the cylinder. The form of the invention shown in Figure 7 is of substantially H-shape in cross section, as indicated by the character 10. The forms of the bodies of the ring, as shown in Figures 6 and 7 both present annular lubricant grooves 11 between the spaced bearing surfaces.

Each shoulder 2 for the rings 3 of the body 1 is arcuately curved in cross section and the rings are curved to conform thereto so that when seated on the shoulders they will be prevented from accidentally slipping off of the shoulders.

A ring of the character described is inexpensive to manufacture, will be durable and will effectively provide a seal between a piston and the walls of the cylinder to prevent the escape of compression and the passing of lubricant by the piston. Any lubricant wiped from the walls of the cylinder by the bearing surfaces will accumulate in the annular lubricant cylinder and may drain therefrom either through the slots or grooves heretofore mentioned. When the ring is constructed with the body 1 and the rings 3 it provides a construction wherein the rings 3 when worn may be readily removed from the body and replaced by others so as to reduce to a minimum the cost of piston ring replacement.

What is claimed is:

1. A piston ring comprising an annular body, annular shoulders extending laterally from the side faces of said annular body of smaller diameter than the latter, said annular shoulders being cupped in cross section, and rings mounted on said annular shoulders of larger outside diameters than the annular body, said rings being fashioned to lie in the cupped cross sectional formations of said annular shoulders for connecting the rings with the annular body.

2. A piston ring comprising an annular body, annular shoulders extending laterally from the side faces of said annular body of smaller diameter than the latter, said annular shoulders being cupped in cross section, and rings mounted on said annular shoulders of larger outside diameters than the annular body, said rings being fashioned to lie in the cupped cross sectional formations of said annular shoulders for connecting the rings with the annular body, said rings cooperating with the periphery of the annular body to provide a lubricant collecting groove, said annular body being provided with lubricant drainage means communicating with the groove.

3. A piston ring comprising an annular body, annular shoulders extending laterally from the side faces of the annular body of smaller diameter than the latter, said annular shoulders being provided with peripheral grooves, and rings mounted on said annular shoulders of larger outside diameters than the annular body, said rings being shaped to partly lie in said grooves for connecting the rings with the annular body.

RALPH J. MARVIN.